United States Patent [19]
Nakazawa et al.

[11] Patent Number: 5,675,404
[45] Date of Patent: Oct. 7, 1997

[54] METHOD AND SYSTEM FOR RECOGNIZING BEHAVIOR OF OBJECT

[75] Inventors: Fumihiko Nakazawa; Fumitaka Abe, both of Kawasaki, Japan

[73] Assignee: Fujitsu Limited, Kawasaki, Japan

[21] Appl. No.: 420,686

[22] Filed: Apr. 12, 1995

[30] Foreign Application Priority Data

Jun. 15, 1994 [JP] Japan ................ 6-133332

[51] Int. Cl.$^6$ .................. G01C 3/08; G01C 21/02; G08B 13/18; G08B 11/26
[52] U.S. Cl. .................. 356/4.01; 250/206.2; 340/555; 356/141.1; 356/152.1
[58] Field of Search .................. 356/4.01, 5.01–5.15, 356/152.1, 141.1; 340/555; 180/169; 901/47; 250/206.2

[56] References Cited

U.S. PATENT DOCUMENTS

| | | | |
|---|---|---|---|
| 3,620,626 | 11/1971 | Daly et al. | |
| 4,477,184 | 10/1984 | Endo | |
| 4,497,065 | 1/1985 | Tisdale et al. | 382/1 |
| 4,902,126 | 2/1990 | Koechner | 180/169 |
| 5,144,685 | 9/1992 | Nasar et al. | 382/48 |
| 5,471,296 | 11/1995 | Parker et al. | 356/139.06 |
| 5,475,494 | 12/1995 | Nishida et al. | 356/4.01 |
| 5,517,300 | 5/1996 | Parker et al. | 356/139.06 |

FOREIGN PATENT DOCUMENTS

| | | |
|---|---|---|
| 59-129809 | 11/1984 | Japan |
| 62-108106 | 5/1987 | Japan |
| 62-135086 | 6/1987 | Japan |
| 5-288528 | 11/1993 | Japan |

*Primary Examiner*—Stephen C. Buczinski
*Attorney, Agent, or Firm*—Armstrong, Westerman, Hattori, McLeland & Naughton

[57] ABSTRACT

A method includes steps of measuring a distance in a straight line to an object within a target area by means of a range finder; storing object data indicative of the measured distance in a memory; repeating the above steps a plurality of times; and comparing n-th object data with (n−1)-th object data to detect whether the object changes in distance to the range finder; whereby recognizing a behavior of the object, and a system includes; a range finder for measuring a distance in a straight line to an object within a target area to output distance data corresponding to the measured distance means for periodically sampling the output distance data; a memory for storing the sampled distance data as object data and means for comparing n-th object data with (n−1)-th object data to output a judging signal representing whether the object changes in distance to the range finder when a difference between both the object data exceeds a predetermined value.

12 Claims, 9 Drawing Sheets

METHOD AND SYSTEM FOR RECOGNIZING BEHAVIOR OF OBJECT

BACKGROUND OF THE INVENTION

1. Field of the Invention

The present invention relates to a method and a system for recognizing a behavior of an object and, more particularly, to vision techniques that allow computer systems to recognize objects in an outside environment, which are applicable to computer systems such as guest reception robots and electronic pets adapted to detect and respond to the behavior of a human object.

2. Description of Related Arts

As personal computers are now widely used and penetrate into our daily life, usability and familiarity are important factors required for computer systems. The vision technique is one information inputting technique indispensable to communications between computers and human. Aiming at realizing a vision function similar to the vision system of human eyes, attempts are now being made to improve the feasibility of the vision technique.

TV cameras are widely used as a vision sensor for industrial robots. Though the TV cameras can detect complicated configuration of an object, the subsequent image processing requires a significant time to extract necessary information from acquired image data. It is also possible to detect the movement of the object (whether the object stands still or moves) by comparing image data acquired at different times, as disclosed in Japanese Unexamined Patent Publication 62(1987)-135086. Where the shape of an object is not known, however, it is extremely difficult to distinguish an image difference due to a migration of the object (e.g., the object moving closer to the TV camera) from that due to a change in the object size (e.g., the size of the object growing larger) by way of the image processing.

Mobile robots employ range finders for measuring a distance to an object to detect obstacles and moving targets. Exemplary range finders include a time-of-flight type which is adapted to measure a time period from the emission of an ultrasonic wave or light beam to the reception of that reflected on an object, and a trigonometric type which is adapted to measure a deflection angle between a light emitting direction and light receiving direction of an infrared or laser beam.

To expand the measuring range (or visual field), a range finder itself or range finding beam emitted from the range finder is allow to scan (as disclosed in Japanese Unexamined Patent Publication 62(1987)-108106), or range finders are located at plural points. As for the scanning of range finding beam, Japanese Unexamined Patent Publication 59(1984)-129809 discloses a camera autofocusing technique for detecting the minimum distance to an object by scanning with an infrared beam.

Further, Japanese Unexamined Patent Publication 5(1993)-288528 discloses a data processing method for obtaining positional data of individual objects in a visual field by grouping distance data of the objects measured in a plurality of directions as viewed from a certain view point on a basis of distance value to identify the respective objects in the visual field.

As described above, the methods for detecting the presence of an object, size of the object and position of the object relative to a view point in a particular space by measuring a distance to an object by means of a range finder have already been put into practical applications.

However, conventional vision systems having a range finder and data processing unit cannot detect the depthwise movement of an object. That is, the conventional systems cannot detect whether the object moves toward or away from a view point. In this context, the object means concrete objects including human objects and other living objects.

With a vision system capable of detecting the movement of an object, a system for monitoring an off-limits area, for example, can not only judge whether some object similar in size to a human object enters the off-limits area, but also analyze the behavioral pattern of the entrant to take the best measures in accordance with the behavioral pattern thereof. Further, the vision system capable of detecting the movement of an object can realize a humane computer system environment, which enables a computer system, for example, to appropriately respond to a computer operator in accordance with a change in the attitude of the operator.

SUMMARY OF THE INVENTION

In accordance with one aspect of the present invention, there is provided a method for object recognition, comprising the steps of: measuring a distance in a straight line to an object within a target area by means of a range finder; storing object data indicative of the measured distance in a memory; repeating the above steps a plurality of times; and comparing n-th object data with (n−1)-th object data to detect whether the object changes in distance to the range finder; whereby recognizing a behavior of the object. In accordance with another aspect of the present invention, there is provided a system for recognizing a behavior of an object comprising: a range finder for measuring a distance in a straight line to an object within a target area to output distance data corresponding to the measured distance; means for periodically sampling the output distance data; a memory for storing the sampled distance data as object data; and means for comparing n-th object data with (n−1)-th object data to output a judging signal representing whether the object changes in distance to the range finder when a difference between both the object data exceeds a predetermined value.

DETAILED DESCRIPTION OF THE PREFERRED EMBODIMENTS

The object in this method or system means concrete objects including human objects and other living objects.

The range finder may comprise a light emitting element for emitting a straight beam to an object and a light receiving element for detecting an angle of light reflected from the object. For example, a infrared light emitting diode or laser diode is used for the light emitting element and a photo-diode array or CCD array is used for the light receiving element.

The memory for storing the object data may include a RAM.

The means for sampling the data output from the range finder and the means for comparing n-th object data with (n−1)th object data to output the judging signal may be composed of a MPU(microprocessor unit).

Figure 1:
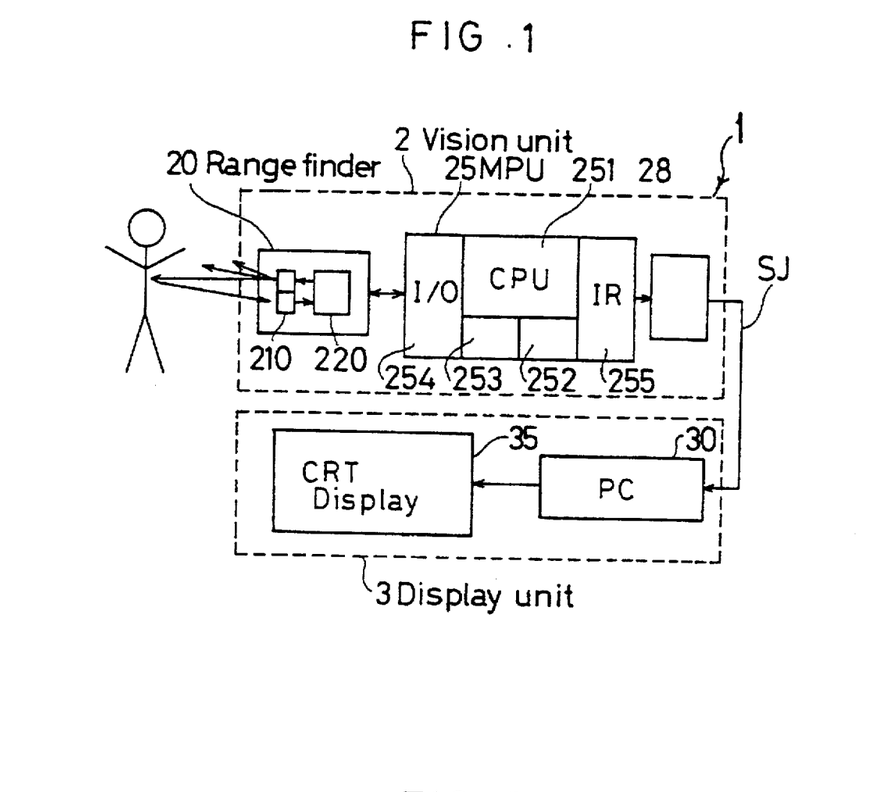
FIG. 1 is a block diagram illustrating the functional structure of an object recognition system in accordance with a first embodiment of the present invention.
Figure 2:
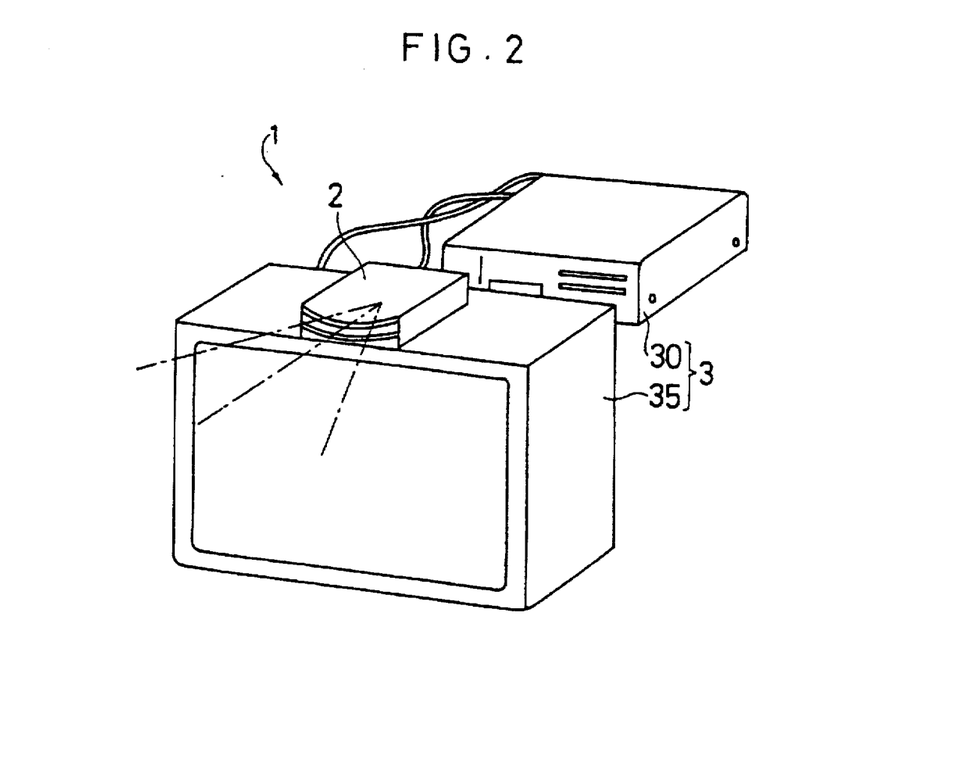
FIG. 2 is a perspective view illustrating the external appearance of the object recognition system.

FIG. 1 is a block diagram illustrating the functional structure of an object recognition system 1 in accordance with a first embodiment of the present invention, and FIG. 2 is a perspective view illustrating the external appearance of the object recognition system 1.

The object recognition system 1 includes a vision unit 2 for outputting a state judging signal SJ indicative of the movement (behavior) of a human object and a display unit 3 for displaying predetermined information in response to the state judging signal SJ. The object recognition system 1 is applicable, for example, to an automatic guest reception system for greeting and guiding a guest.

The display unit 3 includes a personal computer (PC) 30 and a CRT display 35 having a color display function and voice outputting function. In the object recognition system 1, the vision unit 2 is disposed on the middle portion of the top face of the CRT display 35 as shown in FIG. 2, and serves to detect the movement of the human object standing in front of the CRT display 35. The CRT display 35 gives a message to the human object detected by the vision unit 2.

The vision unit 2 includes a range finder 20 for outputting a signal indicative of an object distance, an MPU (microprocessor unit) 25 for controlling the driving of the range finder 20 and processing data of the object distance, and an interface 28 for outputting the state judging signal SJ to the PC 30.

The MPU 25 includes a CPU 251 for running programs, an ROM 252 for preliminarily storing therein programs and data for arithmetic operations, an RAM 253 for temporarily storing therein object data indicative of the result of range finding, and I/O ports 254 and 255. The I/O port 254 includes an A/D convertor for quantifying analog signals output from the range finder 20.

The range finder 20 includes an optical range finding system 210 of trigonometric type, and an electric circuit board 220 having a light emission driver circuit for the optical range finding system 210 and a light reception signal processing circuit.

Figure 3A:
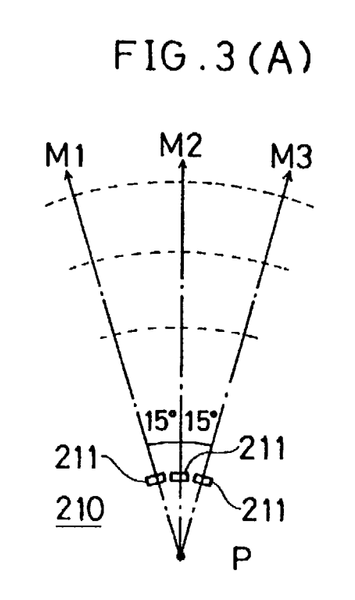
FIGS. 3(A) and 3(B) are diagrams for explaining the structure and range finding principle of an optical range finding system in accordance with the first embodiment.
Figure 3B:
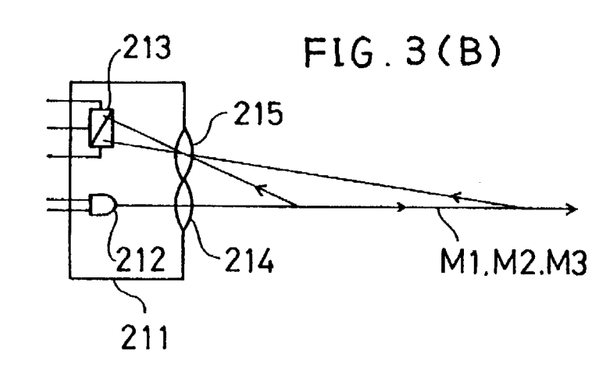

FIG. 3 is a diagram for explaining the structure and range finding principle of the optical range finding system 210.

The optical range finding system 210 of the range finder 20 includes three optical range finding sensors 211 disposed radially with respect to a virtual view point P as shown in FIG. 3(A). Range finding axes M1 and M3 of the right and left optical range finding sensors 211 respectively form an angle of 15° with respect to a range finding axis M2 of the middle optical range finding sensor 211. That is, a target area (or visual field) of the range finding system 210 is defined by an arc-shaped area having a central angle of 30° in a plane.

The optical range finding sensors 211 each have an infrared LED 212, a position sensitive detector (PSD) 213, a lens 214 for light projection, and a lens 215 for light reception. In the optical range finding sensors 211, as may be well known, a light focusing position on a light receiving surface of the PSD 213 varies depending on the object distance (i.e., depending on the infrared reflecting position on the object). The optical range finding sensors 211 each convert the object distance into an electrical signal, based on the light focusing position. A sensor using a semiconductor laser as a light emitting element for light projection, a sensor using a CCD array as a light receiving element or a sensor of the type adapted to control light beam reception by an aperture may otherwise be used for the optical range finding sensor 211.

Next, the operation of the object recognition system 1 will be described by taking an automatic guest reception system as an example.

Figure 4:
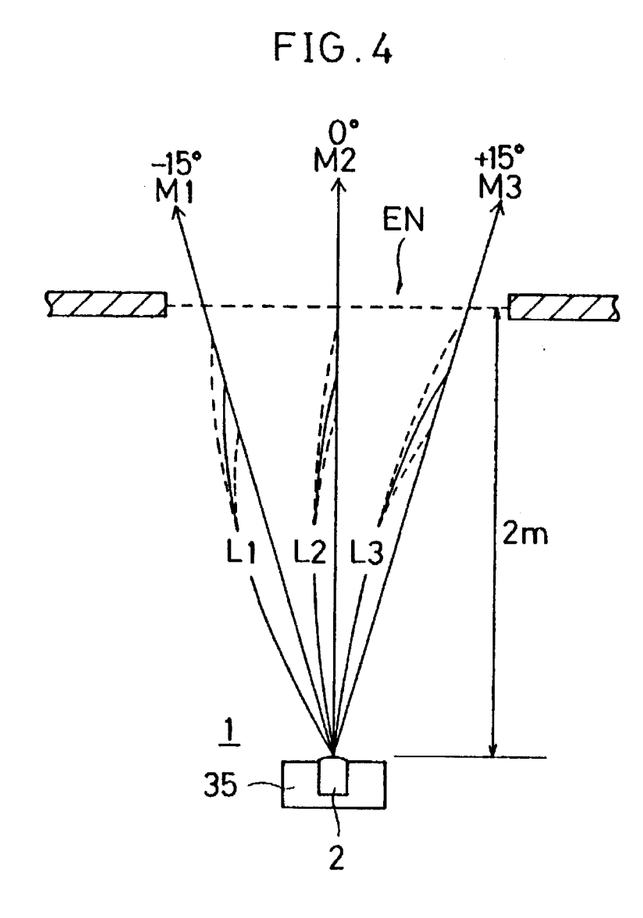
FIG. 4 is a schematic diagram for explaining an exemplary usage of the object recognition system in accordance with the first embodiment.

FIG. 4 is a schematic diagram for explaining the exemplary usage of the object recognition system.

In FIG. 4, the object recognition system 1 is disposed opposite an entrance EN having a width of about 120 cm in a room. The minimum distance between the entrance EN and the object recognition system 1 is 2 m. A person (or guest) coming into the room from the entrance EN may immediately find the CRT display 35.

The range finder 20 of the vision unit 2 continuously or intermittently emits infrared beams toward the person along the range finding axes M1, M2 and M3 to measure object distances L1, L2 and L3 between the range finder 20 and the person in three directions, and outputs photoelectric conversion signals corresponding to the respective object distances L1, L2 and L3. The effective measuring range of the range finder 20 is about 2.5 m at maximum and, if there exists no object within 2.5 m from the range finder 20, the range finder 20 outputs a signal indicative of infinity.

The object distances L1, L2 and L3, in strict sense, mean distances between the respective optical range finding sensors 20 and the object present in front thereof, but are regarded as distances along the range finding axes M1, M2 and M3 between the view point P (see FIG. 3) and the object in the following explanation. The distances between the respective optical range finding sensors 211 and the view point P are constant. Therefore, the range finding signals indicative of the distances along the range finding axes M1, M2 and M3 between the object and the view point P can easily be obtained by providing proper offsets to the outputs of the optical range finding sensors 211 for subsequent amplification.

Figure 5:
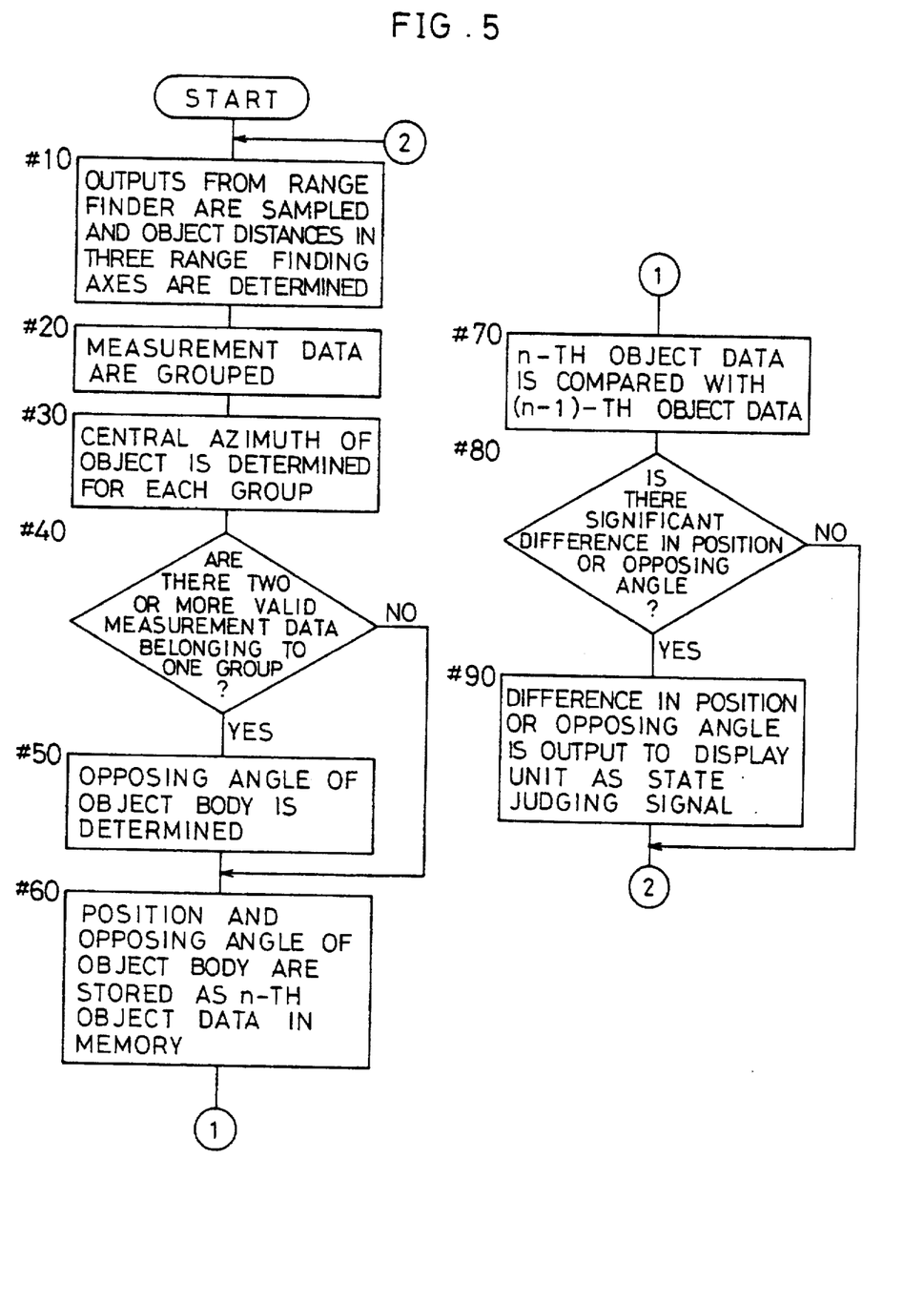
FIG. 5 is a flow chart showing the operation of an MPU of a vision unit in accordance with the first embodiment.

FIG. 5 is a flow chart showing the operation of an MPU of the vision unit 2.

The MPU 25 samples outputs from the three optical range finding sensors 211 of the range finder 20 simultaneously or successively in a short cycle for quantification of the outputs, and measures the object distances L1, L2 and L3 along the range finding axes M1, M2 and M3 substantially at the same time (step #10). The sampling is repeated, for example, in a cycle of 100 ms, and a process to be described below is performed after every sampling.

Following the measurement of the object distances L1, L2 and L3, the MPU 25 performs a process for detecting the number of entrants. More specifically, if a difference between object distances measured by two adjacent optical range finding sensors is less than a predetermined value and the values of these object distances are close to each other, these object distances are grouped together in a data group corresponding to a single object (or a single entrant) (step #20). For example, if the values of the object distances L1 and L2 are close to each other and the values of the object distances L1 and L3 are close to each other, the object distances L1, L2 and L3 all belong to one data group which corresponds to a single entrant. In this embodiment, the reference value of the distance difference for the grouping is 40 cm which is generally equal to a possible maximum value of the trunk width of a standard person. If there exists no object other than a human object who enters the room, and if the difference between the object distances measured along the respective range finding axes exceeds 40 cm, it is judged that another entrant stands diagonally behind the entrant who first comes in. This judgment is based on an idea that, even if the entrant walks into the room sideward, the depth of the entrant can hardly exceed 40 cm. In this grouping process, the positions of the opposite transverse ends of the object are determined.

Upon completion of the data grouping, a central azimuth which corresponds to the position of the center of an object body is determined for every data group (step #30). At this time, the azimuthal position of the range finding axis M2 is regarded as a reference azimuth (i.e., the azimuth of the range finding axis M2 is 0°). Accordingly, the azimuth of the range finding axis M1 is −15°, and the azimuth of the range finding axis M3 is +15°. For example, the central azimuth of an object which belongs to a data group having object distances L1, L2 and L3 is 0°, the central azimuth of an object which belongs to a data group having object distances L1 and L2 is −7.5°, and the central azimuth of an object which belongs to a data group having only an object distance L3 is +15°.

Next, an opposing angle e is calculated (steps #40 and #50). The opposing angle θ is an intersecting angle formed between a line perpendicular to a range finding axis and a line defined between the opposite transverse ends of the object body (or a line transverse to the width of the object body). That is, the opposing angle e means the orientation of the object body with respect to the CRT display 35.

Figure 6:
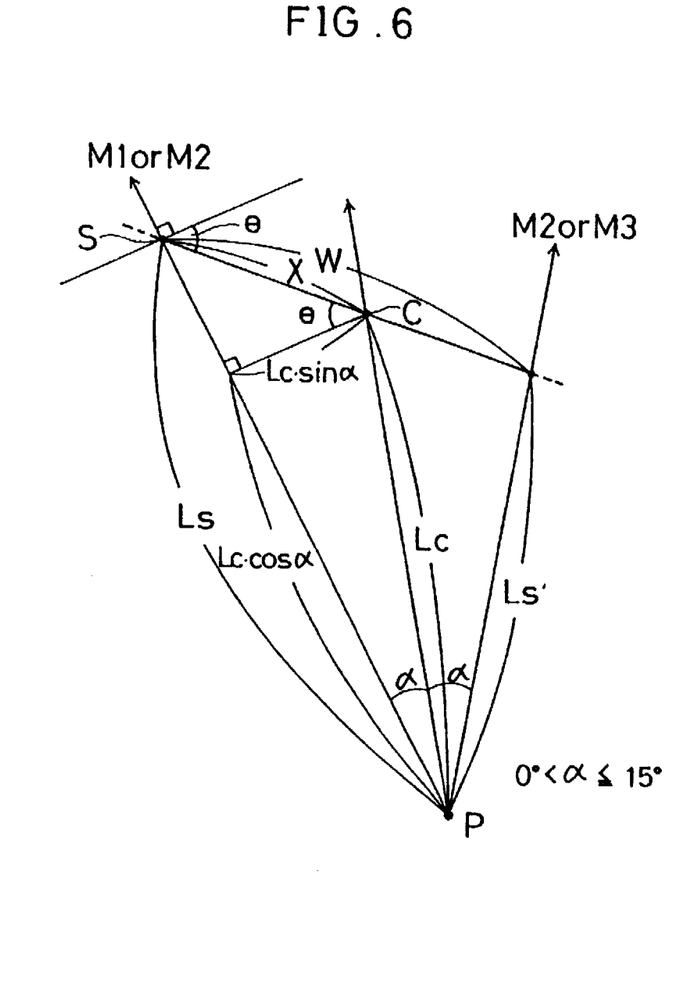
FIG. 6 is a schematic diagram for explaining a calculation in accordance with the first embodiment.

FIG. 6 is a schematic diagram for explaining a calculation of an opposing angle θ and width W.

The opposing angle θ is calculated as follows:

$$\theta = \tan^{-1} Ls\text{-}Lc \cos \alpha / Lc \sin \alpha$$

$$\theta = \tan^{-1} Ls\text{-}Lc/Lc \sin \alpha \quad (1)$$

where Lc is an object distance at the central azimuth of the object, Ls is an object distance of the left end of the object as viewed from the view point P, and α is an azimuth angle between the central azimuth and the azimuth of either end of the object body. To determine the object distance Lc at the central azimuth for the calculation of the opposing angle θ, the mean value of the object distance Ls to the left end of the object and the object distance Ls' to the right end of the object is calculated.

The orientation of the object is determined by comparing the object distances Ls and Ls". That is, if the right end of the object is closer to the view point P than the left end of the object as shown in FIG. 6, the front portion of the object is oriented right as viewed from the side of the object, or oriented left as viewed from the view point P. In this case, the orientation of the object is herein defined as "left orientation" as viewed from the view point P. When the object is in the left orientation, the opposing angle θ is a positive value.

On the other hand, if the left end of the object is closer to the view point P than the right end of the object, the front portion of the object is oriented left as viewed from the side of the object, or oriented right as viewed from the view point P. In this case, the orientation of the object is herein defined as "right orientation" as viewed from the view point P. When the object is in the right orientation, the opposing angle θ is a negative value.

After the calculation of the opposing angle θ, data including positional data (the central azimuth and object distance) and opposing angle θ are stored as n-th object data in the RAM 253 for every object (or for every entrant) (step #60 in FIG. 5). At this time, if the opposing angle e is indeterminate, object data including a parameter indicating so is generated.

Next, (n−1)-th object data stored in the RAM 253 at the previous measurement is collated with the latest n-th object data (step #70), and the positional data and opposing angle θ included in the n-th object data are compared with those included in (n−1)-th object data. If these data have a positional difference or angular difference exceeding a predetermined value, i.e., if notable movement of the object is observed, the vision unit 2 outputs to the display unit 3 a state judging signal indicative of the movement of the object, and samples the next outputs from the range finder 20 (steps #80 and #90).

Figure 7:
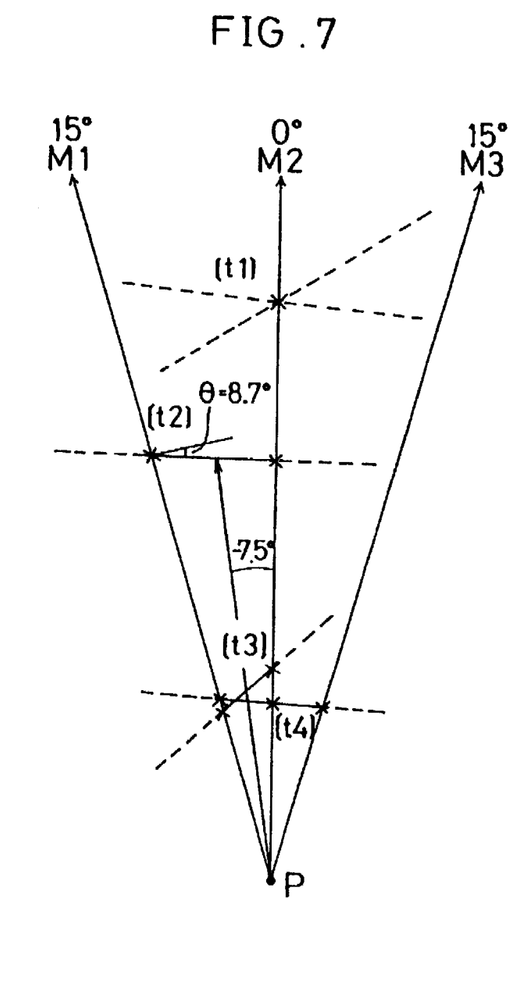
FIG. 7 is a schematic diagram for explaining an example of the behavior of an entrant in accordance with the first embodiment.

FIG. 7 is a schematic diagram for explaining an example of the behavior of an entrant. Table 1 shows the object distances L1, L2 and L3 at the times t0 to t4 shown in FIG. 7.

| Time | Object distances (cm) | | |
| --- | --- | --- | --- |
|  | L1 | L2 | L3 |
| t0 | ∞ | ∞ | ∞ |
| t1 | ∞ | 169 | ∞ |
| t2 | 128 | 123 | ∞ |
| t3 | 51 | 62 | ∞ |
| t4 | 55 | 52 | 53 |

∞:Infinity

As shown in Table 1, at the first sampling time t0, the object distances L1, L2 and L3 along the range finding axes M1, M2 and M3 are all infinite, indicating that nobody exists in the room. In this state, the CRT display 35 displays nothing.

At the second sampling time t1, the object distance L2 along the range finding axis M2 (or at an azimuth of 0°) is 169 cm, indicating that somebody exists in the room. At this time, the opposing angle θ is indeterminable. In response to the detection of an entrant, the CRT display 35 displays some information, for example, an illustration of an agent.

At the third sampling time t2, the entrant is in a position at an azimuth of −7.5° and about 126 cm (=(128+123)/2) away from the view point P. The opposing angle θ of the entrant which is calculated from the equation (1) is 8.7° and, therefore, the entrant is in left orientation.

A comparison of the object data sampled at the time t1 with that sampled at the time t2 indicates that the entrant moves closer to the view point P by 43 cm (=169−126) during the period from the time t1 to the time t2.

At the fourth sampling time t3, the entrant is in a position at an azimuth of −7.5° and about 57 cm away from the view point P. The opposing angle θ is −36.7° and, therefore, the entrant is in right orientation.

This indicates that the entrant moves closer to the view point P by 69 cm (=126−57) and turns around from the left to the right by about 45° during the period from the time t2 to the time t3. Since the entrant does not face front of the CRT display 35 after the rotational movement, the CRT display 35 does not update the displayed information in response to the rotational movement of the entrant.

At the fifth sampling time t4, the entrant is in a position at an azimuth of 0° and about 52 cm away from the view point P. The opposing angle θ is 4.2° and, therefore, the entrant is in left orientation.

This indicates that the position of the entrant remains substantially unchanged but turns around from the right to the left by about 33° during the period from the time t3 to the time t4. The entrant faces front of the CRT display 35 after the rotational movement, and it is considered that the entrant intentionally changes the orientation of his body to face the CRT display 35. At this time, the agent in an animation displayed on the screen of the CRT display 35, for example, bows and speaks to the entrant for greeting.

In the trigonometric range finding process of an optical range finding sensor, the resolution for object detection can be improved by employing a scanning technique for multi-directional range finding, which will be described in the following embodiment.

Figure 8:
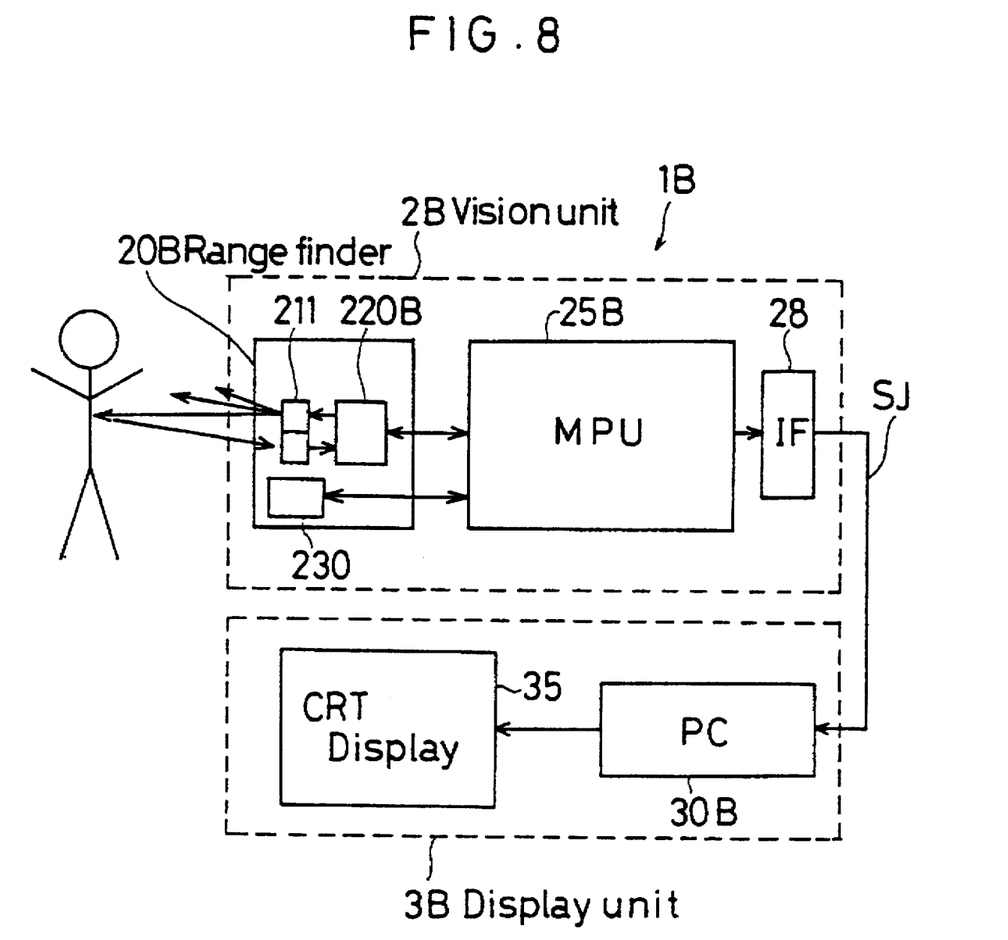
FIG. 8 is a block diagram of an object recognition system in accordance with a second embodiment of the present invention.

FIG. 8 is a block diagram of an object recognition system 1B in accordance with a second embodiment of the present invention.

The object recognition system 1B includes a vision unit 2B having a range finder 20B and an MPU 25B, and a display unit 3B having a PC 30B serving as a display controlling means, and has substantially the same functions as the aforesaid object recognition system 1.

The range finder 20B includes an optical range finding sensor 211, a scanning mechanism 230 of a known structure for deflecting a light path by a mirror, and an electric circuit board 220B. The driving of the scanning mechanism 230 is controlled by the MPU 25B.

Figure 9:
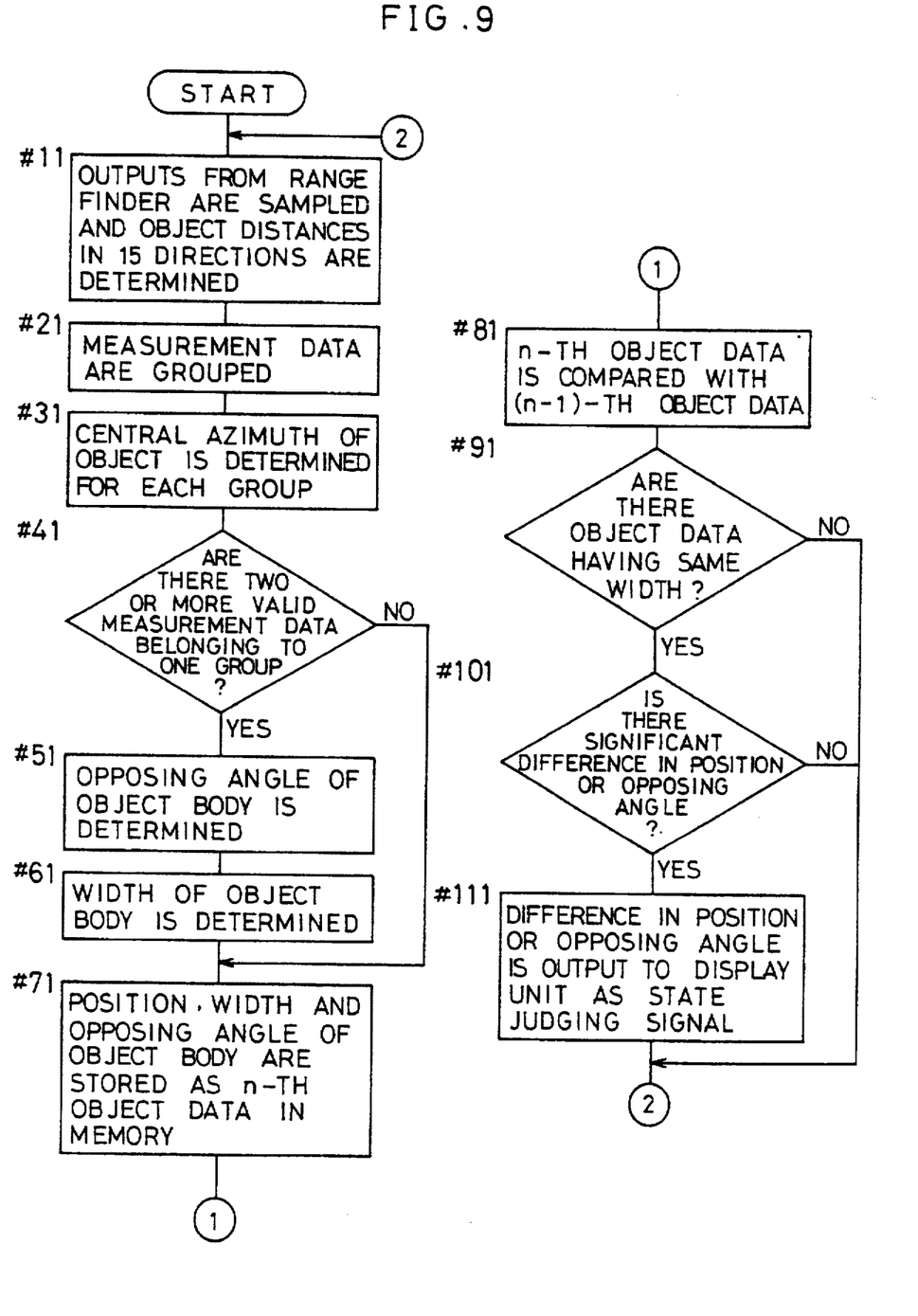
FIG. 9 is a flow chart showing the operation of an MPU of a vision unit in the object recognition system in accordance with the second embodiment of the present invention.

FIG. 9 is a flow chart showing the operation of the MPU 25B of the vision unit 2B.

Figure 10:
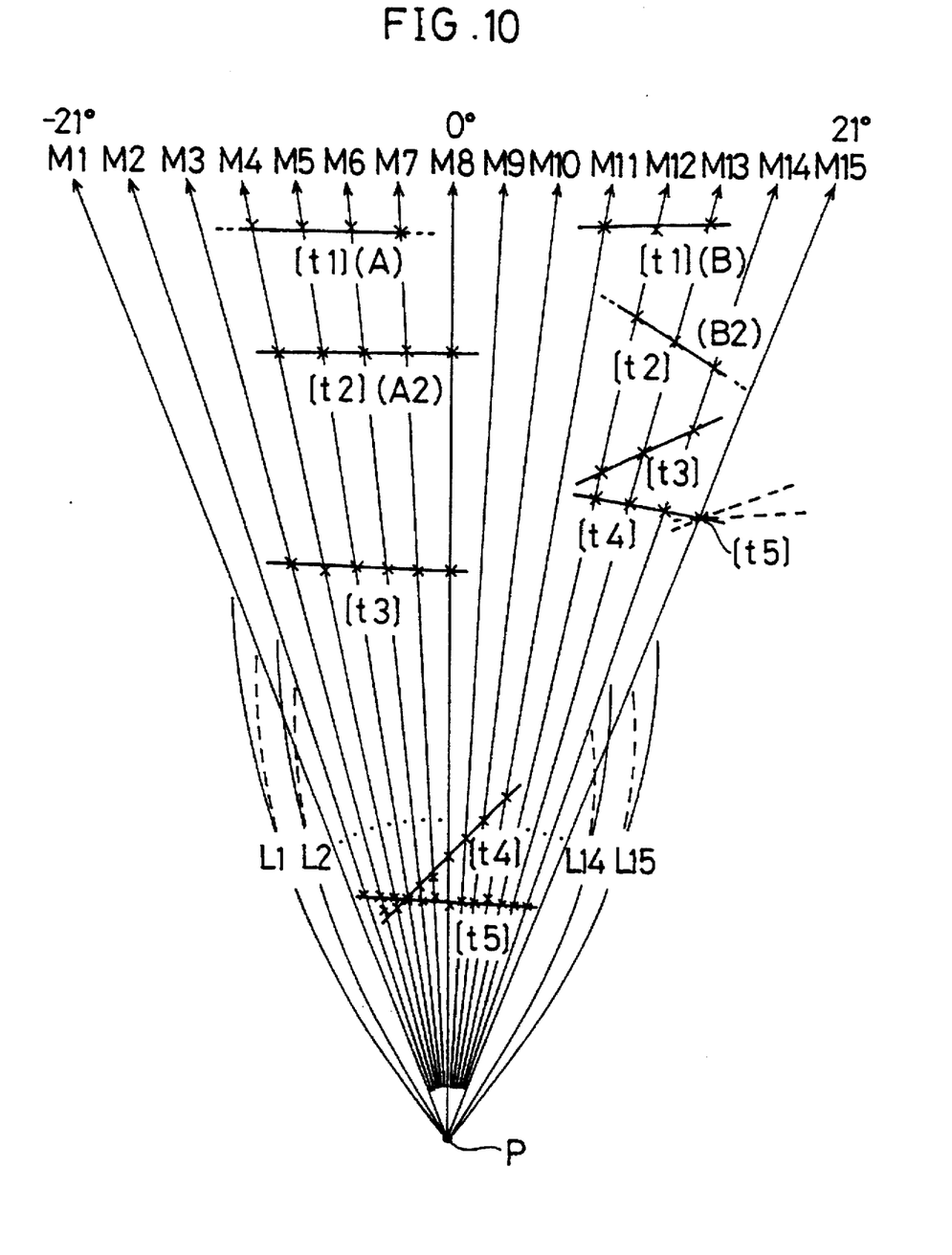
FIG. 10 is a schematic diagram for explaining another example of the behavior of an entrant in accordance with the second embodiment.

The MPU 25B samples range finding signals output from the range finder 20B at 15 sampling points in the course of a scanning in a range finding cycle (step #11), and object distances L1 to L15 are measured in 15 directions M1 to M15 arranged at intervals of 3° (see FIG. 10). That is, the target area for range finding of the range finder 20B is defined by an arc-shaped area having a central angle of 42° (=3°×14) in a plane.

Following the measurement of the object distances L1 to L15, the MPU 25 performs a grouping process for grouping measurement data (step #21). This makes it possible to determine the number of objects (or entrants) and the positions of the opposite transverse ends of each of the objects. Like the foregoing embodiment, the reference value of the distance difference for grouping is 40 cm, which is generally equal to a possible maximum value of the trunk width of a standard person.

Upon completion of the data grouping, a central azimuth which corresponds to the position of the center of an object body is determined for every data group (step #31). At this time, the azimuthal position in the range finding direction M8 is regarded as a reference azimuth (i.e., the azimuth of the range finding direction M8 is 0°). If the number of measurement data belonging to one data group is an odd number, an azimuthal position in the central range finding direction among the range finding directions grouped together is regarded as the central azimuth of an object attributed to the data group. On the other hand, if the number of the measurement data belonging to the data group is an even number, an azimuthal position in a middle direction between the two central range finding directions is regarded as the central azimuth of the object.

An opposing angle e as shown in FIG. 6 is calculated from the equation (1) for a data group having two or more valid object distances (steps #41 and #51). In this case, the opposing angle θ for the data group is obtained by calculating opposing angles at the right and left ends of the object and then averaging these opposing angles. If the number of measurement data belonging to the data group is an even number, an object distance Lc at the central azimuth of the object is calculated by averaging object distances in two central range finding directions in the data group.

Following the calculation of the opposing angle θ, the width W of the object (entrant) is calculated (step #61 in FIG. 9). The width W is twice as long as a distance x between the center C and either end S of the object. Therefore, the width W is expressed by the following equation (2):

$$x = Lc \sin \alpha / \cos \alpha$$
$$W = 2x$$
$$W = 2Lc \sin \alpha / \cos \alpha \qquad (2)$$

After the calculation of the width W, data including positional data (the central azimuth and object distance), width W and opposing angle θ are stored as n-th object data in an RAM not shown for every object (or for every entrant) (step #71 in FIG. 9). At this time, if the width W or opposing angle θ is indeterminate, object data including a parameter indicating so is generated.

Next, (n−1)-th object data stored in the RAM in the previous measurement is collated with the latest n-th object data (step #81). If the value of the width W of the n-th object data agrees with that of the (n−1)-th object data, these object data are attributed to the same object.

The positional data and opposing angle θ in the (n−1)-th object data are compared with those in n-th object data for the object having substantially the same width in the n-th and (n−1)-th object data. If these data have a positional difference or angular difference exceeding a predetermined value, i.e., if notable movement of the object is observed, the vision unit 2B outputs to the display unit 3B a state judging signal indicative of the movement of the object, and samples the next range finding signals output from the range finder 20B (steps #91, #101 and #111).

The object recognition system 1B having the MPU 25B for performing the above mentioned process can be applied to an automatic guest reception system, like the first embodiment shown in FIG. 4.

FIG. 10 is a schematic diagram for explaining another example of the behavior of an entrant. Table 2 shows the object distances L1 to L15 measured in the directions M1 to M15 at sampling times t0 to t5 as shown in FIG. 10.

TABLE 2

| | Object distances (cm) | | | | | | | | | | | | | | |
|---|---|---|---|---|---|---|---|---|---|---|---|---|---|---|---|
| Time | L1 | L2 | L3 | L4 | L5 | L6 | L7 | L8 | L9 | L10 | L11 | L12 | L13 | L14 | L15 |
| t0 | ∞ | ∞ | ∞ | ∞ | ∞ | ∞ | ∞ | ∞ | ∞ | ∞ | ∞ | ∞ | ∞ | ∞ | ∞ |
| t1 | ∞ | ∞ | ∞ | 201 | 199 | 197 | 196 | ∞ | ∞ | ∞ | 199 | 200 | 203 | ∞ | ∞ |
| t2 | ∞ | ∞ | ∞ | 173 | 171 | 170 | 170 | 169 | ∞ | ∞ | ∞ | 182 | 177 | 175 | ∞ |
| t3 | ∞ | ∞ | 128 | 126 | 125 | 124 | 123 | 123 | ∞ | ∞ | ∞ | 148 | 153 | 161 | ∞ |
| t4 | ∞ | ∞ | 51 | 51 | 53 | 55 | 58 | 62 | 66 | 71 | 77 | 142 | 142 | 143 | 144 |
| t5 | ∞ | 56 | 55 | 54 | 53 | 53 | 53 | 52 | 52 | 52 | 53 | 53 | 53 | 54 | 144 |

∞: Infinity

As shown in Table 2, at the time t0, the object distances L1 to L15 in the 15 range finding directions M1 to M15 are all infinite, indicating that nobody exists in the room. In this state, the CRT display 35 displays nothing.

At the time t1, the object distances L4 to L7 are within an effective range and close to each other, and the object distances L11 to L13 are also within the effective range and close to each other. This indicates that there are two objects (entrants) A and B are in the room. Object data for these objects A and B are as follows:

Object A

Distance from the view point: 198 cm (=(199+197)/2)

Azimuth: −7.5°

Opposing angle θ: 9.1°

Orientation: Left

Width W: 31.5 cm

Object B

Distance from the view point: 200 cm (=L12)

Azimuth: 12°

Opposing angle θ: −10.7°

Orientation: Right

Width W: 21.3 cm

The value of the width W of the object B indicates that the object B seems to be a child. In response to the detection of the two entrants, the CRT display 35 displays some information, for example, an illustration of an agent.

At the time t2, there are two objects A2 and B2. Object data for these objects A2 and B2 are as follows:

Object A2

Distance from the view point: 170 cm (=L6)

Azimuth: −6°

Opposing angle θ: 6.4°

Orientation: Left

Width W: 35.7 cm

Object B2

Distance from the view point: 177 cm (=L13)

Azimuth: 15°

Opposing angle θ: 20.6°

Orientation: Left

Width W: 19.8 cm

A comparison of the object data sampled at the time t1 with those sampled at the time t2 shows that the width difference between the objects A and A2 and the width difference between the objects B and B2 are small. Therefore, the object A2 is identified with the entrant A (adult) and the object B2 is identified with the entrant B (child).

These object data show that the entrant A moves straight toward the view point P by 28 cm without changing his orientation during the period from the time t1 to the time t2.

On the other hand, the child moves forward by 28 cm, deviating a little from a straight direction toward the view point P, and greatly turns around from the right to the left as viewed from the view point P.

By comparing object data obtained at the times t2 to t5 in the same manner as described above, the movements of the entrants A and B can be determined. If notable movement is observed during a range finding cycle, the CRT display 35 displays a predetermined information in accordance with the positions and orientations of the entrants after the movement. In this case, for example, the entrant A turns around near the CRT display 35 to face opposite the CRT display 35 during the period from the time t4 to the time t5 and, in response thereto, the object recognition system 1B performs an operation for greeting the entrant A.

In accordance with the first and second embodiments of the present invention, the object recognition system 1 and 1B can detect not only the depthwise movement but also the orientation of an object (entrant) by calculating an opposing angle θ. Hence, the object recognition system 1 and 1B can highly intelligently respond to the behavior of the entrant in a manner similar to a human response.

Further, in accordance with the second embodiment of the present invention, the width W of an object (or entrant) calculated every sampling time is temporarily stored, and the identity of the object is confirmed every sampling time by comparing the width W calculated at the present sampling time with the width calculated at the previous sampling time. Therefore, where the object recognition system 1B is used in an environment in which plural persons may be present within the target area thereof, the movements of the persons can independently be detected without performing a complicated data processing.

In the first and second embodiments, the object distances may be measured in plural range finding directions within a horizontal plane, within a plane inclined at a certain elevation angle, or within a plane inclined at a certain depression angle, and the range finding directions may be optimized in accordance with the positional relationship between the vision unit 2 or 2B and an object. Further, the distances may otherwise be measured in plural range finding directions within a vertical plane including a horizontal central range finding axis or within a plane rotated at a certain rotation angle around the horizontal central range finding axis.

Further, in the first and second embodiments, the target area for range finding may be expanded to three-dimensional space by employing a two-directional scanning mechanism or by disposing plural range sensors 211 in horizontal and vertical directions. By performing three-dimensional range finding, various movements including bowing movement of an object for greeting can be detected. In such a case, the simultaneity of data sampling at plural sampling points for extensive range finding may be improved by simultaneously pivoting plural range finding sensors 211 radially disposed.

The resolution for range finding in a particularly important target area may be enhanced by locally increasing the density of the range finding axes (or by locally reducing the angular intervals of the range finding axes) in that particular target area. The scanning mechanism may employ a rotary mechanism for pivoting the range finding sensors 211 or a mechanism for moving the range finding sensors 211 parallel to each other.

Figure 11:
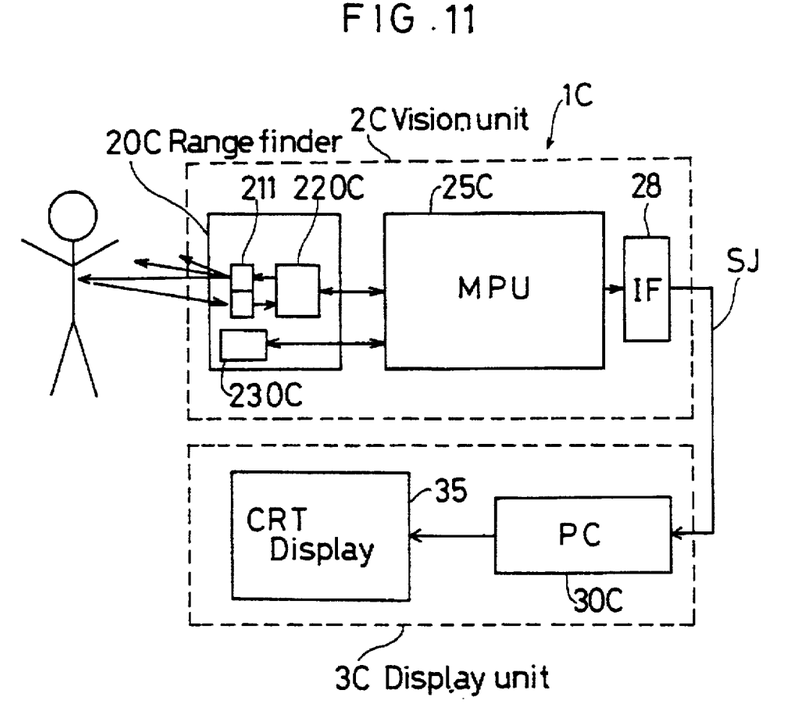
FIG. 11 is a block diagram of an object recognition system in accordance with a third embodiment of the present invention.

FIG. 11 is a block diagram of an object recognition system 1C in accordance with a third embodiment of the present invention.

Figure 12:
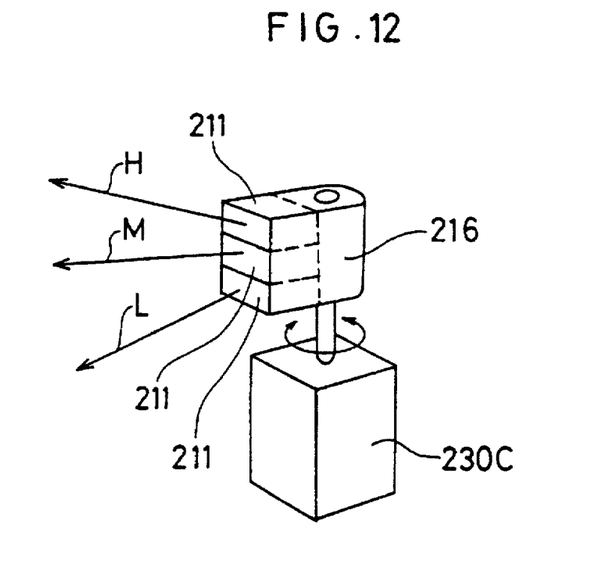
FIG. 12 is a perspective view illustrating the principal portion of the object recognition system in accordance with the third embodiment of the present invention.

The object recognition system 1C includes a vision unit 2C having a range finder 20C and an MPU 25C, and a display unit 3C having a PC 30C serving as a display controlling means, and has substantially the same functions as the aforesaid object recognition system 1. The range finder 20C includes three optical range finding sensors 211 disposed on a rotative member 216 with the range finding axes of the respective sensors extending in a horizontal direction (M), in a direction inclined upwardly at an angle of 15° with respect to the horizontal and in a direction inclined downwardly at an angle of 15° with respect to the horizontal, a rotative scanning mechanism 230C such as a stepping motor for horizontally pivoting the three sensors 211 by an angle of 3° at a time, and an electric circuit board 220C. The driving of the rotative scanning mechanism 230C is controlled by the MPU 25C.

The vision unit 2C is placed on the display unit 3C (at an height of 1 m) positioned 2 m away from an entrance of a room. The sensor 211 inclined at an elevation angle of +15° measures object distances H1 to H15 at 15 measuring points in the highest location. The horizontally oriented sensor 211 measures object distances M1 to M15 at 15 measuring points in the middle location. The sensor 211 inclined at an elevation angle of −15° measures object distances L1 to L15 at 15 measuring points in the lowest location. The range finding axes of the sensors are directed at an azimuth of 0° when object distances H8, M8 and L8 are measured, at an azimuth of −21° when object distances H1, M1 and L1 are measured, and at an azimuth of +21° when object distances H15, M15 and L15 are measured.

The MPU 25C samples range finding signals output from the range finder 20C at 15×3 measuring points in one range finding cycle. Thus, the MPU 25C obtains 15 object distances measured along each of the three range finding axes (i.e., within a plane inclined at an elevation angle of +15°, within a horizontal plane and within a plane inclined at an elevation angle of −15°) at azimuthal intervals of 3°.

Measurement data are processed by the MPU 25C in substantially the same manner as described in the aforesaid embodiments, and input to the PC 30C. The PC 30C updates the display information of the CRT display 35 based on the measurement data.

By using this object recognition system, measurement data shown in Tables 3 to 5 were obtained at sampling times T0 to T6 to detect one adult and one child entering a room. There will hereinafter be described how the PC 30C performs an object recognition process using such data.

TABLE 3

Figure 13:
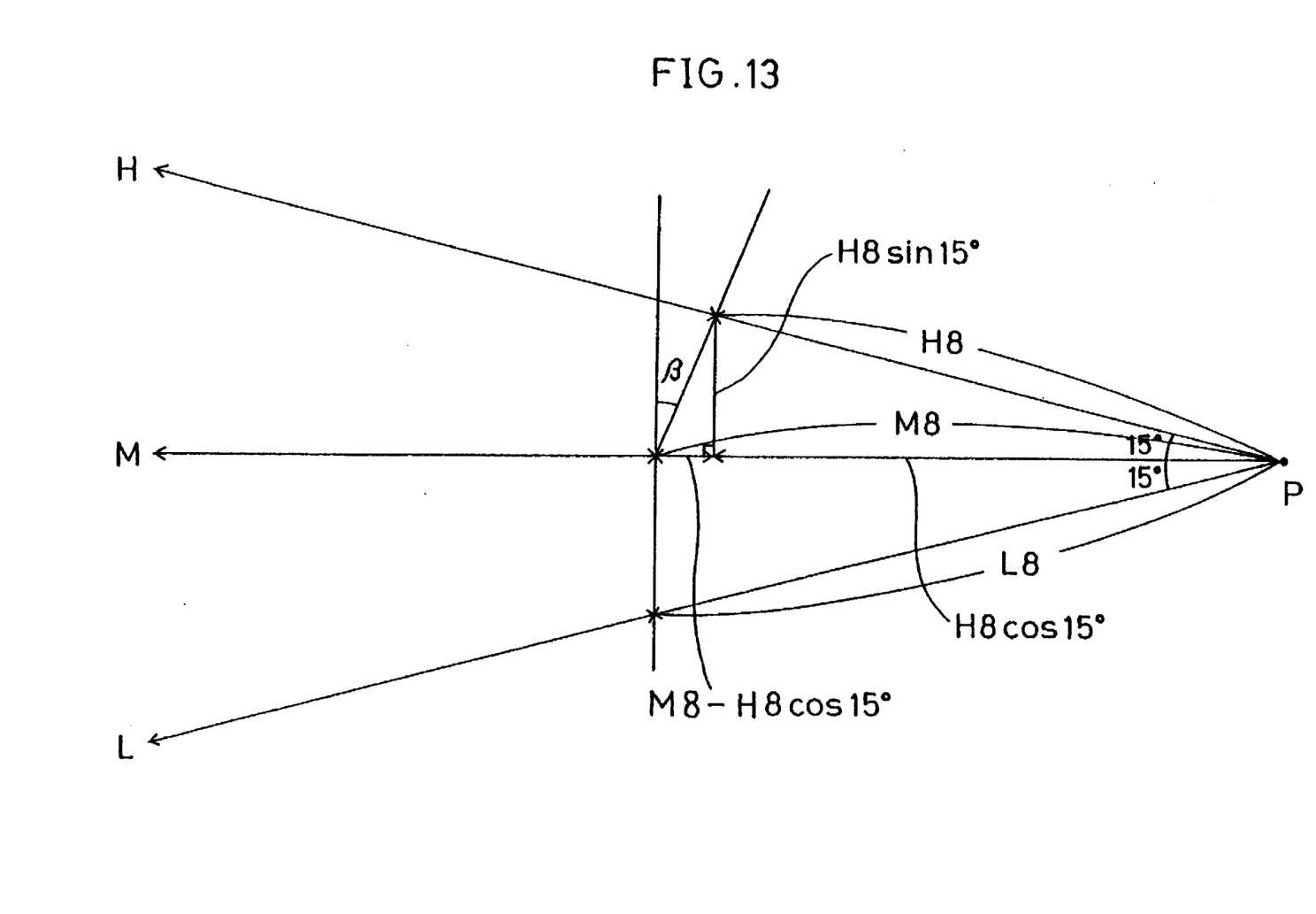
FIG. 13 is a schematic diagram for explaining an object recognition method in accordance with the third embodiment of the present invention.

| | Object distances (cm) | | | | | | | | | | | | | | |
|---|---|---|---|---|---|---|---|---|---|---|---|---|---|---|---|
| Time | H1 | H2 | H3 | H4 | H5 | H6 | H7 | H8 | H9 | H10 | H11 | H12 | H13 | H14 | H15 |
| T0 | ∞ | ∞ | ∞ | ∞ | ∞ | ∞ | ∞ | ∞ | ∞ | ∞ | ∞ | ∞ | ∞ | ∞ | ∞ |
| T1 | ∞ | ∞ | ∞ | 208 | 206 | 204 | 203 | ∞ | ∞ | ∞ | ∞ | ∞ | ∞ | ∞ | ∞ |
| T2 | ∞ | ∞ | ∞ | 179 | 177 | 176 | 176 | 175 | ∞ | ∞ | ∞ | ∞ | ∞ | ∞ | ∞ |
| T3 | ∞ | ∞ | 132 | 130 | 129 | 128 | 127 | 127 | ∞ | ∞ | ∞ | ∞ | ∞ | ∞ | ∞ |
| T4 | ∞ | ∞ | 53 | 53 | 55 | 57 | 60 | 64 | 68 | 74 | 80 | ∞ | ∞ | ∞ | ∞ |
| T5 | ∞ | 58 | 57 | 56 | 55 | 55 | 55 | 54 | 54 | 54 | 55 | 55 | 55 | 56 | ∞ |
| T6 | ∞ | 52 | 51 | 50 | 50 | 50 | 50 | 49 | 49 | 49 | 50 | 50 | 50 | 51 | ∞ |

TABLE 4

| | Object distances (cm) | | | | | | | | | | | | | | |
|---|---|---|---|---|---|---|---|---|---|---|---|---|---|---|---|
| Time | M1 | M2 | M3 | M4 | M5 | M6 | M7 | M8 | M9 | M10 | M11 | M12 | M13 | M14 | M15 |
| T0 | ∞ | ∞ | ∞ | ∞ | ∞ | ∞ | ∞ | ∞ | ∞ | ∞ | ∞ | ∞ | ∞ | ∞ | ∞ |
| T1 | ∞ | ∞ | ∞ | 201 | 199 | 197 | 196 | ∞ | ∞ | ∞ | 199 | 200 | 203 | ∞ | ∞ |
| T2 | ∞ | ∞ | ∞ | 173 | 171 | 170 | 170 | 169 | ∞ | ∞ | ∞ | 182 | 177 | 175 | ∞ |
| T3 | ∞ | ∞ | 128 | 126 | 125 | 124 | 123 | 123 | ∞ | ∞ | ∞ | ∞ | ∞ | ∞ | ∞ |
| T4 | ∞ | ∞ | 51 | 51 | 53 | 55 | 58 | 62 | 66 | 71 | 77 | 142 | 142 | 143 | 144 |
| T5 | ∞ | 56 | 55 | 54 | 53 | 53 | 53 | 52 | 52 | 52 | 53 | 53 | 53 | 54 | 144 |
| T6 | ∞ | 56 | 55 | 54 | 53 | 53 | 53 | 52 | 52 | 52 | 53 | 53 | 53 | 54 | 144 |

TABLE 5

| | Object distances (cm) | | | | | | | | | | | | | | |
|---|---|---|---|---|---|---|---|---|---|---|---|---|---|---|---|
| Time | L1 | L2 | L3 | L4 | L5 | L6 | L7 | L8 | L9 | L10 | L11 | L12 | L13 | L14 | L15 |
| T0 | ∞ | ∞ | ∞ | ∞ | ∞ | ∞ | ∞ | ∞ | ∞ | ∞ | ∞ | ∞ | ∞ | ∞ | ∞ |
| T1 | ∞ | ∞ | ∞ | 208 | 206 | 204 | 203 | ∞ | ∞ | ∞ | 206 | 207 | 210 | ∞ | ∞ |
| T2 | ∞ | ∞ | ∞ | 179 | 177 | 176 | 176 | 175 | ∞ | ∞ | ∞ | 188 | 183 | 181 | ∞ |

TABLE 5-continued

| | | | | | | Object distances (cm) | | | | | | | | | |
|---|---|---|---|---|---|---|---|---|---|---|---|---|---|---|---|
| Time | L1 | L2 | L3 | L4 | L5 | L6 | L7 | L8 | L9 | L10 | L11 | L12 | L13 | L14 | L15 |
| T3 | ∞ | ∞ | 132 | 130 | 129 | 128 | 127 | 127 | ∞ | ∞ | ∞ | 153 | 158 | 167 | ∞ |
| T4 | ∞ | ∞ | 53 | 53 | 55 | 57 | 60 | 64 | 68 | 74 | 80 | 147 | 147 | 148 | 149 |
| T5 | ∞ | 58 | 57 | 56 | 55 | 55 | 55 | 54 | 54 | 54 | 55 | 55 | 55 | 56 | 149 |
| T6 | ∞ | 58 | 57 | 56 | 55 | 55 | 55 | 54 | 54 | 54 | 55 | 55 | 55 | 56 | 149 |

As shown in Tables 3 to 5, at the time T0, all the object distances are infinite, indicating that nobody exists in the room. At this time, the CRT display 35 displays nothing.

At the time T1, the object distances M4 to M7 ranges from 196 cm to 201 cm, and a difference between the maximum distance and the minimum distance is 5 cm. Since the distance difference is smaller than 40 cm which is generally equal to a possible maximum value of the trunk width of a standard person, these object distances M4 to M7 are grouped together in a data group corresponding to an object C (entrant C). The number of measuring points is an even number and, therefore, the distance between the entrant C and a view point is calculated based on the object distances M5 and M6 measured at two central points in a horizontal plane. That is, the distance to the entrant C is calculated by averaging the object distances M5 and M6 as follows:

$$Lc=(199+197)/2=198 \text{ cm}$$

The central azimuth Φ of the entrant C (corresponding to the middle between the azimuthes of the two central points at which the object distances M5 and M6 are measured) is as follows:

Φ=−7.5°

The opposing angle θ and width W of the entrant C are calculated from the equations (1) and (2) in the same manner as described in the foregoing embodiments.

θ=9.1° (left orientation)
W=31.5 cm

The attitude of the entrant C is determined by comparing the object distances L4 to L7, M4 to M7 and H4 to H7 with each other.

$$\begin{pmatrix} L4 \\ L5 \\ L6 \\ L7 \end{pmatrix} = \begin{pmatrix} H4 \\ H5 \\ H6 \\ H7 \end{pmatrix} = \cos^{-1}15° \begin{pmatrix} M4 \\ M5 \\ M6 \\ M7 \end{pmatrix}$$

That is, the entrant C is taller than the highest range finding axis, and supposedly stands up straight. More specifically, the height Z1 of the entrant C is greater than 1.53 m (Z1≧1+2×tan 15°=1.53).

Further, since a difference between the maximum and the minimum of object distances M11 to M13 is 4 cm, the object distances M11 to M13 are grouped together in another data group corresponding to an object D (entrant D). The number of measuring points is an odd number and, therefore, the object distance M12 at the center is employed as the distance between the entrant D and the view point. Other object data are calculated in the same manner as described above.

Lc=M12=200 cm
Φ=12°
θ=−10.7° (right orientation as viewed from the view point)
W=21.3 cm As can be understood, the width of the entrant D is relatively small. In addition, the object distances H11 to H13 are infinite. Therefore, the height Z2 of the entrant D is greater than 1 m and smaller than 1.53 m (1.53≧Z2≧1), and it is judged that the entrant D is a child.

Thus, the object recognition system 1C detects one adult and one child, and the CRT display 35 displays an animation of an agent.

At the time T2, object distances M4 to M8 are judged to belong to a data group corresponding to an object C2. Data of the object C2 are obtained as follows in the same manner as at the time T1.

Lc=M6=170 cm
Φ=−6°
θ=6.4°
W=35.7 cm

On the other hand, object distances M12 to M14 are judged to belong to another data group corresponding to an object D2. Data of the object D2 are as follows.

Lc=M13=177 cm
Φ=15°
θ=20.6°
W=19.8 cm

By comparing the widths W of the objects C and D obtained at the time T1 with the widths W of the objects C2 and D2 obtained at the time T2, respectively, as shown below, the objects C2 and D2 detected at the time T2 are identified with the objects C and D (entrants C and D), respectively.

Entrant C: Width of object C at T1=31.5≈35.7=Width of object C2 at T2

Entrant D: Width of object D at T1=21.3≈19.8=Width of object D2 at T2

The data indicative of the movement of the entrant C (adult) during the period from the time T1 to the time T2 are shown below:.

Distance: 198−170=28 cm (moving closer)
Azimuth: −6−(−7.5)=+1.5°
Orientation: 6.4−9.1=−2.7°

The data indicative of the attitude of the entrant C at the time T2 is as follows:

$$\begin{pmatrix} L4 \\ L5 \\ L6 \\ L7 \\ L8 \end{pmatrix} \approx \begin{pmatrix} H4 \\ H5 \\ H6 \\ H7 \\ H8 \end{pmatrix} = \cos^{-1}15° \begin{pmatrix} M4 \\ M5 \\ M6 \\ M7 \\ M8 \end{pmatrix}$$

That is, the entrant C moves closer to the object recognition system 1C by 28 cm with the body thereof straightening up and with the azimuthal position and orientation thereof remaining substantially unchanged during the period from the time T1 to the time T2.

The data indicative of the movement of the entrant D (child) are shown below:

Distance: 200–177=23 cm (moving closer)

Azimuth: 15–12=3°

Orientation: 20.6-(−10.7)=31.3° (turning around from the right to the left as viewed from the view point)

That is, the entrant D moves closer to the object recognition system 1C by 23 cm, turning around from the fight to the left by an angle of 31°, with the azimuthal position thereof remaining substantially unchanged. Since object distances H12 to H14 are infinite, the height of the entrant D is smaller than the range finding axis upwardly inclined. More specifically, the height of the entrant D is greater than 100 cm and smaller than 147 cm (177×tan 15°+ 100=147).

At the time T3, distances M3 to M8 are judged to belong to a data group corresponding to an object C3. Data of the object C3 are obtained as follows in the same manner as at the time T1.

Lc=(M5+M6)/2=124.5 cm

Φ=−7.5°

θ=8.7°

W=32.8 cm

On the other hand, there is no distance data Mx for a data group corresponding to an object D3. object distances L12 to L14 are employed for the calculation of a distance to the object D3. Since the distances Lx are measured in directions at an elevation angle of −15°, the distances Lx are multiplied by cos 15°. Data of the object D3 are as follows.

Lc=L13×cos 15°=153 cm

Φ=15°

θ=−38.5°

W=20.4 cm

By comparing the widths W of the objects C2 and D2 obtained at the time T2 with the widths W of the objects C3 and D3 obtained at the time T3, respectively, as shown below, the objects C3 and D3 detected at the time T3 are identified with the entrant C and D, respectively.

Entrant C: Width of object C3 at T3=32.8≈35.7=Width of object C2 at T2

Entrant D: Width of object D3 at T3=20.4≈19.8=Width of object D2 at T2

The data indicative of the movement of the entrant C (adult) during the period from the time T2 to the time T3 are shown below:

Distance: 170–124=46 cm (moving closer)

Azimuth: −7.5-(−6)=−1.5°

Orientation: 8.7−6.4=2.3°

That is, the entrant C moves closer to the object recognition system 1C by 46 cm with the azimuthal position and orientation thereof remaining substantially unchanged during the period from the time T2 to the time T3.

The data indicative of the attitude of the entrant C at the time T3 is as follows:

$$\begin{pmatrix} L3 \\ L4 \\ L5 \\ L6 \\ L7 \\ L8 \end{pmatrix} \approx \begin{pmatrix} H3 \\ H4 \\ H5 \\ H6 \\ H7 \\ H8 \end{pmatrix} \cdot \cos^{-1} 15° \approx \begin{pmatrix} M3 \\ M4 \\ M5 \\ M6 \\ M7 \\ M8 \end{pmatrix}$$

That is, the entrant C stands up straight

The data indicative of the movement of the entrant D (child) are shown below:

Distance: 177–153=24 cm (moving closer)

Azimuth: 15–15=0°

Orientation: −38.5-(20.6)=−59.1° (turning around from the left to the right as viewed from the view point)

That is, the entrant D moves closer to the object recognition system 1C by 24 cm, turning around from the left to the right by an angle of 59°, with the azimuthal position thereof remaining substantially unchanged.

Since object distances H12 to H14 and M12 to M14 are infinite, the height of the entrant D is smaller than the horizontal range finding axis. More specifically, the height of the entrant D is greater than 39 cm and smaller than 100 cm (100–153×tan 15°=39), indicating that the entrant D crouches.

At the time T4, object distances M3 to M11 are judged to belong to a data group corresponding to an object C4. Data of the object C4 are obtained as follows in the same manner as at the time T1.

Lc=M7=58 cm

Φ=−3°

θ=−43.9°

W=33.5 cm

On the other hand, object distances M12 to M15 are judged to belong to another data group corresponding to an object D4. Data of the object D4 are as follows.

Lc=(M13+M14)/2=142.5 cm

Φ=16.5°

θ=−5.1°

W=22.4 cm

By comparing the widths W of the objects C4 and D4 obtained at the time T4 with the widths W of the objects C3 and D3 obtained at the time T3, respectively, as shown below, the objects C4 and D4 detected at the time T4 are identified with the entrants C and D, respectively.

Entrant C: Width of object C3 at T3=32.8≈ 33.5=Width of object C4 at T4

Entrant D: Width of object D3 at T3=20.4≈22.4=Width of object D4 at T4

The data indicative of the movement of the entrant C (adult) during the period from the time T3 to the time T4 are shown below:

Distance: 124−58=66 cm (moving closer)

Azimuth: −3-(−7.5)=+4.5°

Orientation: −43.9−8.7=−52.6° (turning around from the left to the right as viewed from the view point)

That is, the entrant C moves closer to the object recognition system 1C by 46 cm, while changing the moving direction by an azimuth angle of +4.5° (closer to the reference azimuth) and turning around from the left to the fight by an angle of 52.6° during the period from the time T3 to the time T4.

The data indicative of the attitude of the entrant C at the time T4 is as follows:

$$\begin{pmatrix} L3 \\ L4 \\ \cdot \\ \cdot \\ \cdot \\ L10 \\ L11 \end{pmatrix} \approx \begin{pmatrix} H3 \\ H4 \\ \cdot \\ \cdot \\ \cdot \\ H10 \\ H11 \end{pmatrix} \cdot \cos^{-1} 15° \approx \begin{pmatrix} M3 \\ M4 \\ \cdot \\ \cdot \\ \cdot \\ M10 \\ M11 \end{pmatrix}$$

That is the entrant C stands up straight.

The data indicative of the movement of the entrant D (child) are shown below

Distance: 153−142.5=10.5 cm (moving closer)

Azimuth: 16.5−(−15)=+1.5°

Orientation: −5.1−(−38.5)=33.4° (turning around from the right to the left as viewed from the view point)

That is, the entrant D moves closer to the object recognition system 1C by 10 cm, turning around from the right to the left by an angle of 33°, with the azimuthal position thereof remaining substantially unchanged.

At this time, the entrant C stands in a position only about 50 cm away from the object recognition system 1C, but the body of the entrant C is oriented at an angle of −44°. Therefore, the agent displayed in the CRT display 35 does not respond to the entrant C.

Since object distances H12 to H15 are infinite, the height of the entrant D is smaller than the range finding axis inclined at an elevation angle of +15°. More specifically, the height of the entrant D is greater than 100 cm and smaller than 138 cm (142.5×tan 15°+100=138).

At the time T5, object distances M2 to M14 are judged to belong to a data group corresponding to an object C5. Data of the object C5 are obtained as follows in the same manner as at the time T1.

Lc=M8=52 cm

Φ=0°

θ=−3.4°

W=32.2 cm

By comparing the width W of the object C5 obtained at the time T5 with the width W of the object C4 obtained at the time T4 as shown below, the object C5 detected at the time T5 is identified with the entrant C.

Entrant C: Width of object C5 at T5=32.2≈33.5=Width of object C4 at T4

The data indicative of the movement of the entrant C (adult) during the period from the time T4 to the time T5 are shown below:

Distance: 58−52=6 cm (moving closer)

Azimuth: 0−(−3)=+3°

Orientation: 3.4−(−43.9)=+39.5°

That is, the entrant C moves a little closer to the object recognition system 1C, while changing the moving direction by an azimuth angle of 3° (closer to the reference azimuth) and turning around from the right to the left by an angle of 39.5° to face front during the period from the time T4 to the time T5.

The data indicative of the attitude of the entrant C at the time T5 is as follows:

$$\begin{pmatrix} L2 \\ L3 \\ . \\ . \\ . \\ L13 \\ L14 \end{pmatrix} \approx \begin{pmatrix} H2 \\ H3 \\ . \\ . \\ . \\ H13 \\ H14 \end{pmatrix} \approx \cos^{-1}15° \begin{pmatrix} M2 \\ M3 \\ . \\ . \\ . \\ M13 \\ M14 \end{pmatrix}$$

That is, the entrant D stands up straight.

In response thereto, the agent displayed in the CRT display 35 greets the entrant C.

At the time T6, object distances M2 to M14 are judged to belong to a data group corresponding to an object C6. Data of the object C6 are obtained as follows in the same manner as at the time T1.

Lc=M8=52 cm

Φ=0°

θ=−3.4°

W=32.2 cm

By comparing the width W of the object C5 obtained at the time T5 with the width W of the object C6 obtained at the time T6 as shown below, the object C6 detected at the time T5 is identified with the entrant C.

Entrant C: Width of object C6 at T6=32.2≈=32.2=Width of object C5 at T5

The data indicative of the movement of the entrant C (adult) during the period from the time T5 to the time T6 are shown below:

Distance: 52−52=0 cm

Azimuth: 0−0=0°

Orientation: −3.4−(−3.4)=0°

These data indicate that the distance and azimuth of the entrant C remain unchanged during the period from the time T5 to the time T6.

The data indicative of the attitude of the entrant C at the time T6 is as follows:

$$\begin{pmatrix} L2 \\ L3 \\ . \\ . \\ . \\ L13 \\ L14 \end{pmatrix} \approx \cos^{-1}15° \begin{pmatrix} M2 \\ M3 \\ . \\ . \\ . \\ M13 \\ M14 \end{pmatrix} > \cos^{-1}15° \begin{pmatrix} H2 \\ H3 \\ . \\ . \\ . \\ H13 \\ H14 \end{pmatrix}$$

The fact that the upper part of the body of the entrant C is closer to the CRT display 35 than the middle and lower parts thereof which are kept generally vertical indicates that the entrant C bows to the CRT display 35 (or bends the upper part of his body toward the CRT display 35).

A bending angle β as shown in FIG. 13 is calculated from the following equation:

$$\beta = \tan^{-1}(H8 \times \sin 15°)/(M8 - H8 \times \cos 15°)$$

In this case, the bending angle β≈30°. Therefore, the entrant C bends the upper part of his body forward at about 30°.

In response thereto, the agent displayed in the CRT display 35 bows to the entrant C.

In the foregoing embodiments, the number of range finding points (resolution), sampling cycle, calculation method of opposing angle θ and width W, data content of state judging signals SJ and information to be displayed by the CRT display 35 may be changed depending on applications in consideration of the performance of hardware to be used. It is also possible to employ the time-of-flight range finding method indeed of the trigonometric approach.

Further, in the foregoing embodiments, the display controlling function may be provided to the vision units 2, 2B and 2C not to the PCs 30, 30B and 30C, and the vision units 2, 2B and 2C may be connected directly with the CRT display 35 to allow the object recognition system to display in accordance with the behavior of the entrant.

In accordance with the present invention, the depthwise movement of an object as viewed from a particular view point can easily and assuredly detected without performing a complicated image processing. In particular, the vision units of the present invention allow for the construction of a highly feasible information processing system capable of properly responding to the behavior of human objects and other living objects, thereby expanding computer applications.

What is claimed is:

1. A method comprising the steps of:
   measuring distances in a plurality of straight lines radially extending from a range finder to an object within a target area;
   calculating a gradient of the object with respect to one of the straight lines based on the measured distances;
   storing object data indicative of the calculated gradient in a memory;
   repeating the above steps a plurality of times;
   comparing n-th object data with (n−1)-th object data to calculate a rotation angle of the object; and
   recognizing a behavior of the object when the calculated rotation angle is larger than a predetermined value.

2. A method comprising the steps of:
   measuring distances in a plurality of straight lines radially extending from a range finder to an object within a target area;
   extracting distances in two straight lines extending to opposite edges of the object from the measured distances to calculate a size of the object based on the extracted distances and an angle between the two straight lines;
   calculating data indicative of a state of the object based on the measured distances;
   storing object data indicative of the calculated data and the size in a memory;
   repeating the above steps a plurality of times;
   comparing n-th object data with (n−1)-th object data;
   determining that both the n-th object data and the (n−1)-th object data are data obtained from the same object when a difference between the sizes included in both the n-th object data and the (n−1)-th object data is smaller than a predetermined value; and
   recognizing a behavior of the object based on a difference between both the n-th object data and the (n−1)-th object data obtained from the same object.

3. A method of claim 2, in which the data indicative of a state of the object includes data representing at least one of a position of the object, an opposing angle of the object with respect to the range finder and a morphological attitude of the object.

4. A method of claim 1 or 2, further comprising the step of displaying an image on a display device, the image corresponding to the recognized behavior.

5. A system comprising:
   a range finder for measuring distances in a plurality of straight lines radially extending from the range finder to an object within a target area to output distance data corresponding to the measured distances;
   means for periodically sampling the output distance data;
   means for calculating a gradient of the object with respect to one of the straight lines based on the sampled distance data;
   a memory for storing object data indicative of the calculated gradient;
   means for comparing n-th object data with (n−1)-th object data to calculate a rotation angle of the object; and
   means for recognizing a behavior of the object when the calculated rotation angle is larger than a predetermined value.

6. A system of claim 5, in which the range finder emits straight beams to an object and detects the beams reflected by the object to measure a distance to the object.

7. A system comprising:
   a range finder for measuring distances in a plurality of straight lines radially extending from the range finder to an object within a target area to output distance data corresponding to the measured distances;
   means for periodically sampling the output distance data;
   means for extracting distances in two straight lines extending to opposite edges of the object from the measured distances to calculate a size of the object based on the extracted distances and an angle between the two straight lines;
   means for calculating state data indicative of a state of the object based on the measured distances;
   a memory for storing object data indicative of the state data and the size;
   means for comparing n-th object data with (n−1)-th object data;
   means for determining that both the n-th object data and the (n−1)-th object data are obtained from the same object when a difference between the sizes included in both the object data is smaller than a predetermined value;
   means for outputting a judging signal representing a behavior of the object when a difference in the state data between the n-th object data and the (n−1)-th object data obtained from the same object exceeds a predetermined value.

8. A system of claim 7, in which the data indicative of a state of the object includes data representing at least one of a position of the object, an opposing angle of the object with respect to the range finder and a morphological attitude of the object.

9. A system of claim 7, in which the range finder includes a plurality of optical sensors, each of the sensors emitting a straight light beam to an object and detecting the beam reflected by the object to measure a distance to the object, the plurality of the optical sensors arranged so that beams of the optical sensors are radially emitted.

10. A system of claim 7, in which the range finder includes an optical sensor for emitting a straight beam to an object and detecting the beam reflected by the object to measure a distance to the object and scanning means for rotating the optical sensor so that the beam emitted from the optical sensor scans the target area.

11. A system of claim 7, in which the range finder includes a plurality of optical sensors, each of the sensors emitting a straight light beam to an object and detecting the beam reflected by the object to measure a distance to the object, the optical sensors arranged so that beams of the optical sensors are radially emitted on a vertical plane, scanning means for rotating the optical sensors so that the beams emitted from the optical sensors horizontally scan the target area.

12. A system of claim 7, further comprising a display device which displays an image corresponding to the judging signal.

* * * * *